US012496596B2

(12) United States Patent
Hofman

(10) Patent No.: US 12,496,596 B2
(45) Date of Patent: Dec. 16, 2025

(54) VORTEX VENTURI WATER SPRAYING ASSEMBLY

(71) Applicant: ETL, LLC, Sparks, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 470 days.

(21) Appl. No.: 17/849,536

(22) Filed: Jun. 24, 2022

(65) Prior Publication Data

US 2022/0314245 A1 Oct. 6, 2022

Related U.S. Application Data

(63) Continuation-in-part of application No. 16/722,729, filed on Dec. 20, 2019, now abandoned.

(51) Int. Cl.
*B05B 1/18* (2006.01)
*B05B 1/34* (2006.01)

(52) U.S. Cl.
CPC ............ *B05B 1/185* (2013.01); *B05B 1/3442* (2013.01)

(58) Field of Classification Search
CPC .. B05B 1/18; B05B 1/185; B05B 1/34; B05B 1/3442; B05B 1/3415; B05B 7/10; B05B 1/06; B05B 7/30; B05B 7/0425; B05B 7/0441; B05B 7/0408; B05B 7/066
USPC ........ 239/382, 8, 335, 366, 368, 369, 419.5, 239/425.5, 428.5
See application file for complete search history.

(56) References Cited

U.S. PATENT DOCUMENTS

| | | | | | |
|---|---|---|---|---|---|
| 4,573,639 | A * | 3/1986 | Logue | B05B 7/0425 4/596 |
| 4,579,284 | A * | 4/1986 | Arnold | B05B 1/083 239/381 |
| 4,998,836 | A | 3/1991 | Scripnick | |
| 6,343,750 | B1 | 2/2002 | Engel | |
| 7,611,070 | B2 | 11/2009 | Paoluccio | |
| 2007/0210185 | A1 * | 9/2007 | Paoluccio | B05B 15/40 239/310 |
| 2012/0043400 | A1 | 2/2012 | Heyse et al. | |
| 2016/0228885 | A1 | 8/2016 | Cutler et al. | |
| 2018/0318886 | A1 | 11/2018 | Libbrecht et al. | |

FOREIGN PATENT DOCUMENTS

JP 6113132 B2 4/2017

* cited by examiner

*Primary Examiner* — Arthur O. Hall
*Assistant Examiner* — Juan C Barrera
(74) *Attorney, Agent, or Firm* — ONE LLP

(57) ABSTRACT

A water spraying assembly is provided which includes a fluid conduit, a vortex chamber, an intermediate chamber, and a nozzle chamber. The intermediate chamber has a constricted section which increases the velocity of water that passes through the nozzle chamber. Further, the nozzle has one or more holes which project through the nozzle chamber's sidewall where the intermediate chamber enters into the nozzle chamber. The vortex chamber is positioned between the fluid conduit and the intermediate chamber. The vortex chamber rotates the flow of water around the showerhead's longitudinal axis before the water enters the nozzle's intermediate chamber. This causes the water to swirl within the intermediate chamber and nozzle chamber to increase the effect of air aspirating into water within the showerhead's nozzle.

7 Claims, 7 Drawing Sheets

VORTEX VENTURI WATER SPRAYING ASSEMBLY

RELATED APPLICATIONS

The present application is a continuation-in-part of U.S. patent application Ser. No. 16/722,729, filed Dec. 20, 2019.

BACKGROUND OF THE INVENTION

The invention relates generally to water spraying apparatus including but not limited to showerheads and faucets.

Spray heads are commercially available in numerous designs and configurations for use in showers, faucets, spas, sprinklers and other personal and industrial systems. Spray heads may be categorized as being either stationary or oscillating and may have fixed or adjustable openings. Stationary spray heads with fixed jets are the simplest construction consisting of a central conduit which connects a water source to one or more spray jets directed to produce a constant pattern. Multi-function spray heads are able to deliver water in different spray patterns such as a fine spray, a coarse spray, a pulsating spray, or even a flood pattern producing a high fluid flow.

Many conventional showerheads simply convey the inlet water stream into a desired spray pattern. Many water supply systems are supplied by well water. This water usually has a low level of dissolved oxygen in the water. Many rural well supplies have less than one part per million of dissolved oxygen in the water. The low level of dissolved oxygen results in less cleaning action and may have a foul smell. As a result, these showerheads utilize more water when showering because it takes longer to clean one's body than an air aspirating type showerhead. With less dissolved oxygen in the water, more water is used, and more energy is used to heat the water.

In addition, as the world population increases, more water supplies are derived from deep wells. Water from these wells generally has a very low level of dissolved oxygen. The level may be less than one part per million. This reduces the probability of oxidation of the piping used to deliver the water, however, the water having a low level of dissolved oxygen is less pleasant for the user and does not clean as well as aerated water that is enriched with oxygen.

In attempts to overcome these problems, showerheads have been developed that include a venturi to introduce air molecules into the water. However, it would be desirable to increase the amount of air introduced into the flow of water.

SUMMARY OF THE INVENTION

Briefly, in accordance with the invention, an improved water spraying assembly is provided which includes at least one primary spray head nozzle, and which may include one or more ancillary nozzles. The water spraying assembly has particular application for use within a showerhead. Accordingly, the preferred water spraying assembly is described as a showerhead assembly. However, the water spraying assembly has application for any water spraying device including faucets, hose nozzles, agricultural spray nozzles, etc.

Much of the preferred showerhead assembly has a relatively traditional construction including a showerhead housing having a central conduit for transporting water from a water supply to one or more spray nozzles which spray water. The showerhead housing is connected to a water source by a neck portion which preferably includes a female threaded inlet which connects to a male threaded pipe which provides the source of water. The showerhead assembly's neck portion is the introduction of the showerhead's central conduit which transports water at least partially through the showerhead assembly's housing to be expelled from the fluid conduit's outlet. Preferably, the neck portion includes a ball joint which enables the showerhead housing to swivel or pivot relative to a male threaded pipe.

The showerhead assembly includes at least one primary nozzle which includes a vortex chamber, an intermediate chamber, and a nozzle chamber. More specifically, the primary nozzle includes a tubular sidewall which forms the intermediate chamber and the nozzle chamber. The intermediate chamber is constricted to form a constricted section which increases the flow of water through the primary nozzle. The primary nozzle's nozzle chamber is immediately downstream of the intermediate chamber so that water exiting the intermediate chamber enters the nozzle chamber. Preferably, the nozzle chamber's inlet has a diameter larger than the intermediate chamber's outlet. Further, the intermediate chamber's outlet includes a tubular section which projects into the nozzle chamber to form an annular region within the nozzle chamber. In addition, the nozzle chamber includes at least one hole which projects through the nozzle chamber's sidewall from exterior of the nozzle chamber's sidewall to the annular region or through the nozzle chamber's sidewall from exterior of the nozzle chamber's sidewall into the nozzle chamber immediately downstream of the intermediate chamber. Preferably, the showerhead assembly has at least two holes which project through the nozzle's sidewall at opposing sides of the nozzle's constricted section.

To increase the velocity of the water as it passes over the nozzle's holes, the preferred primary nozzle includes a vortex chamber which is located between the shower assembly's fluid conduit and the primary nozzle's intermediate chamber. The vortex chamber has an entrance which connects to the fluid conduit's outlet and an exit which connects to the intermediate chamber's inlet. The vortex chamber may be constructed in various ways as could be determined by one skilled in the art so as to take the received water and spin it around very fast, and then introduce the swirling water into the nozzle's inlet.

In a preferred embodiment, the vortex chamber has a cap immediately downflow of the fluid conduit's outlet. The cap diverts the water radially outward in all directions, and then the water is diverted inwardly between a plurality of blades which are arranged uniformly around the nozzle's longitudinal axis. Each of the blades has an outer periphery and an interior side. Further, each of the blades are arranged around the longitudinal axis and are spaced apart so as to form passageways that swirl inwardly around the nozzle's longitudinal axis. When the water passes from the exterior of the blades to the interior of the blades, water is caused to rotate within the vortex chamber until being expelled into the nozzle's interior where the water continues to rotate. As a result of the water having to travel both longitudinally and rotationally past the nozzle's holes, the vortex chamber has increased the velocity of the water and the resulting aspirating effect as air molecules are being introduced to the water stream. The increase in oxygen in the water increases the size of the water droplets, and increases the force of the water ejected from the nozzle's outlet compared to prior showerhead assemblies.

In a preferred embodiment, the showerhead assembly's housing encapsulates the nozzle's sidewall, but not the nozzle's outlet. The housing is radially spaced from the nozzle's sidewall to form an annular cavity in fluid communication with the one or more holes which project through the nozzle's sidewall. Moreover, it is preferred that the housing engage the nozzle's outlet, but that the housing include a plurality of notches positioned circumferentially around the nozzle's outlet. The notches permit the passage of ambient air from exterior of the showerhead assembly into the annular cavity. Once in the annular cavity, air can be aspirated through the holes into the water stream.

Thus, it is the object of the present invention to provide a spray head assembly having an improved aspirated effect compared to previous showerheads.

It is an additional object of the present invention to provide a spray head assembly having an improved aspirated effect which increases the size of the water droplets.

Furthermore, it is still another object of the present invention to provide a spray head assembly having an improved water spraying effect which increases the velocity of the water and force exerted by the water which is expelled from the nozzle's outlet.

BRIEF DESCRIPTION OF THE DRAWINGS

These and other, further and more specific objects and advantages of the invention will be apparent to those skilled in the art from the following detailed description thereof, taken in conjunction with the Drawings, in which.

DETAILED DESCRIPTION OF THE PREFERRED EMBODIMENTS

Figure 1:
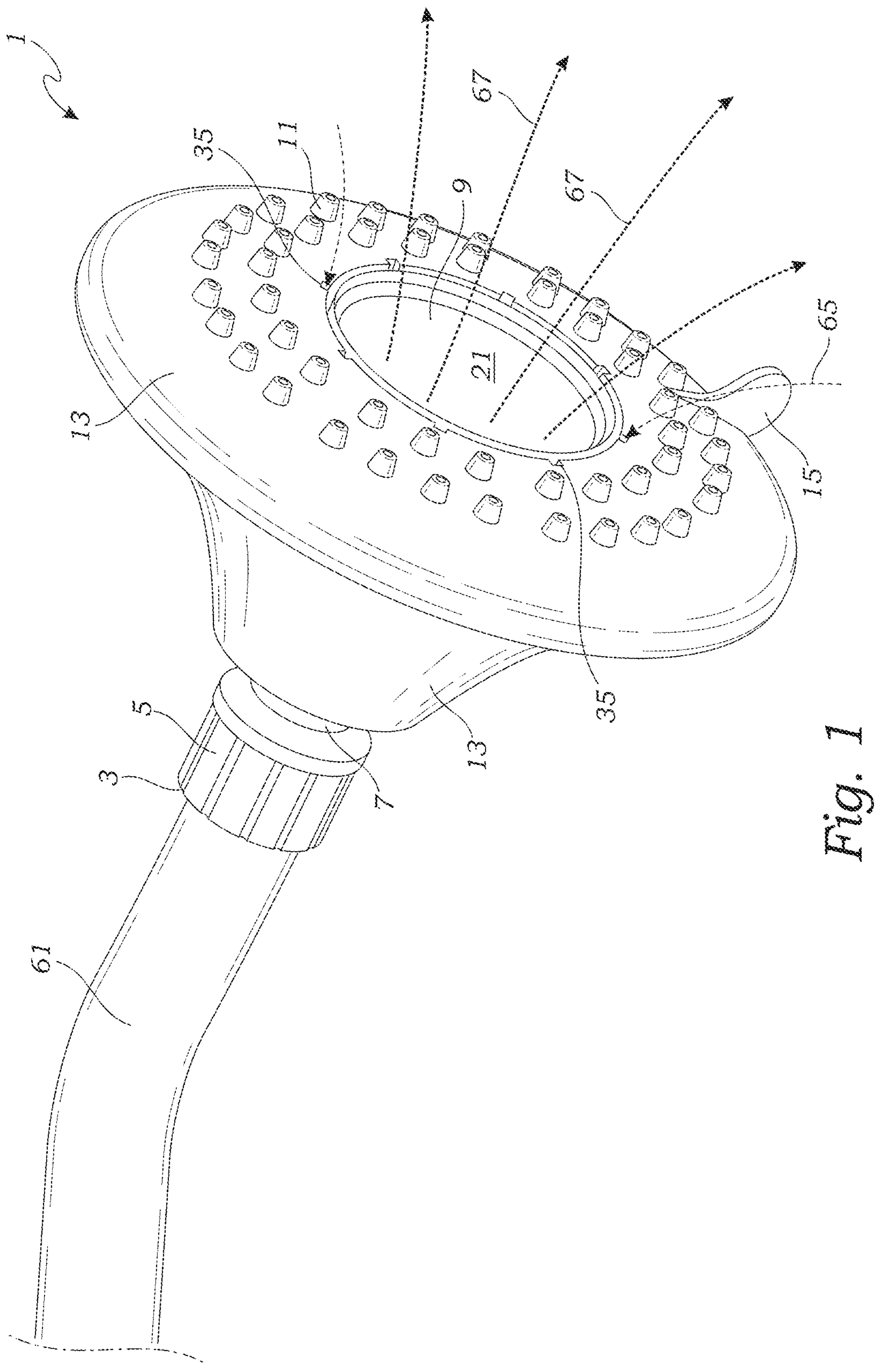
FIG. 1 is a perspective view of the showerhead assembly of the present invention connected to a pipe.
Figures 2, 3, 4:
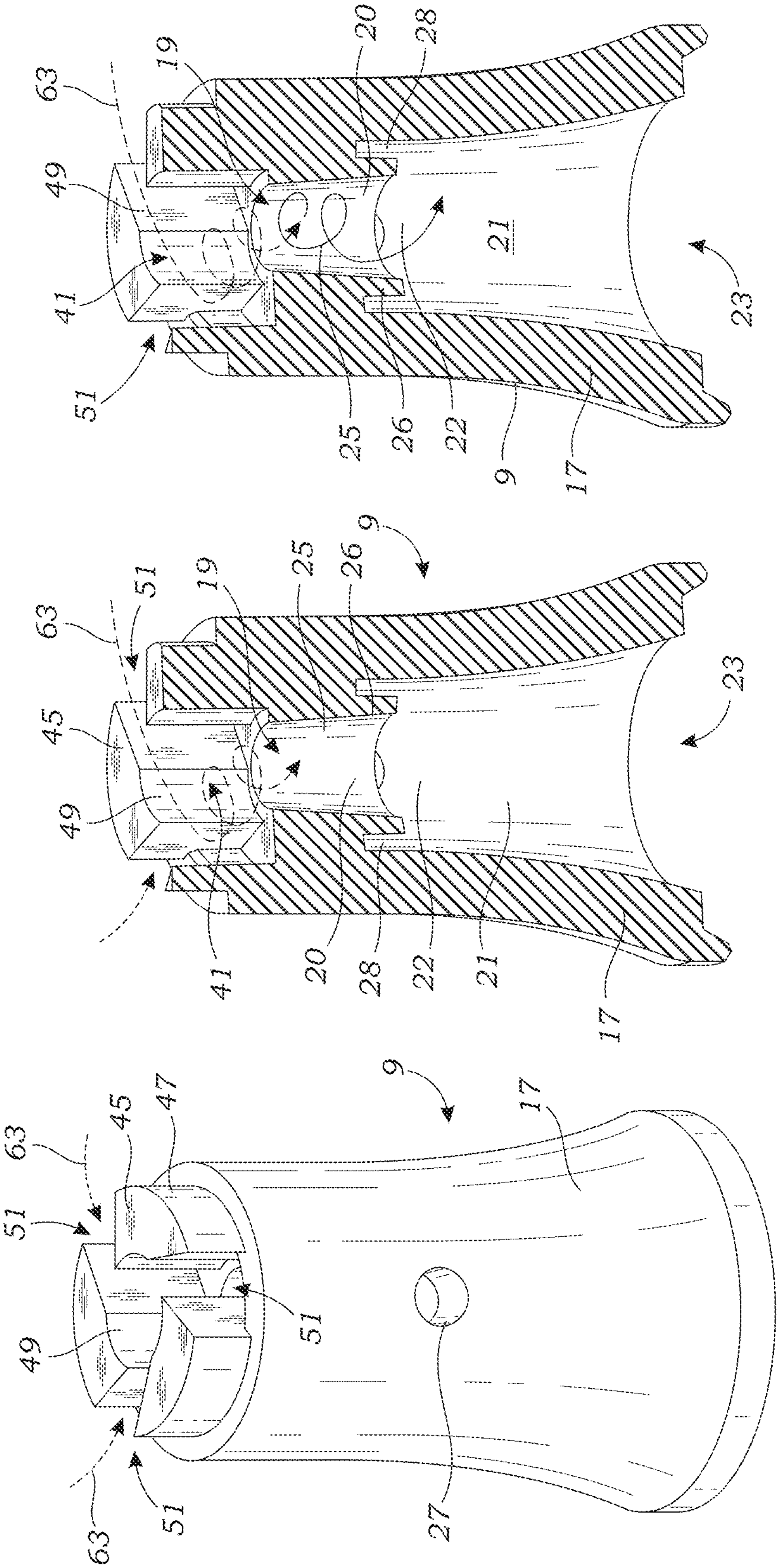
FIG. 2 is a top perspective view of the showerhead assembly's nozzle and vortex chamber's interior.
FIG. 3 is a perspective cutaway view of the nozzle and vortex chamber illustrated in FIG. 2 with arrows illustrating the passage of water through the vortex chamber's passageways into the nozzle's inlet.
FIG. 4 is a perspective cutaway view of the nozzle and vortex chamber illustrated in FIG. 2 with arrows illustrating the passage of water through the vortex chamber into the nozzle's central chamber.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIG. 1-16, the spray head of the present invention is illustrated as a showerhead assembly 1 which includes three primary components including: a fluid conduit 2, a vortex chamber 41, and a primary nozzle 9. In addition, the showerhead assembly may include a housing 13, and any number of ancillary nozzles 11. As illustrated in FIG. 1, both the primary nozzle 9 and any ancillary nozzles 11 are located within the housing 13. In the event that the showerhead assembly 1 contains a plurality of different nozzles, preferably the showerhead assembly 1 includes a manual controller 15 in the form of a tab or the like for allowing one to selectively obstruct or permit the flow of water 63 through the primary nozzle and/or the ancillary nozzles.

The fluid conduit 2 connects the nozzles 9 and 11 to a water source 61. Preferably, the water source consists of a male threaded pipe 61 which is typically found in a traditional shower stall. The fluid conduit 2 has an inlet 3 for receiving water, an outlet 4 for expelling water, and a body for conveying water 63 from the inlet 3 to the outlet 4. Preferably, the fluid conduit's inlet 3 includes a female threaded neck 5 for connecting to the water supply's male threaded pipe 61 and a ball joint 7 which allows the housing 13 to pivot or swivel relative to the male threaded pipe 61.

Figure 9:
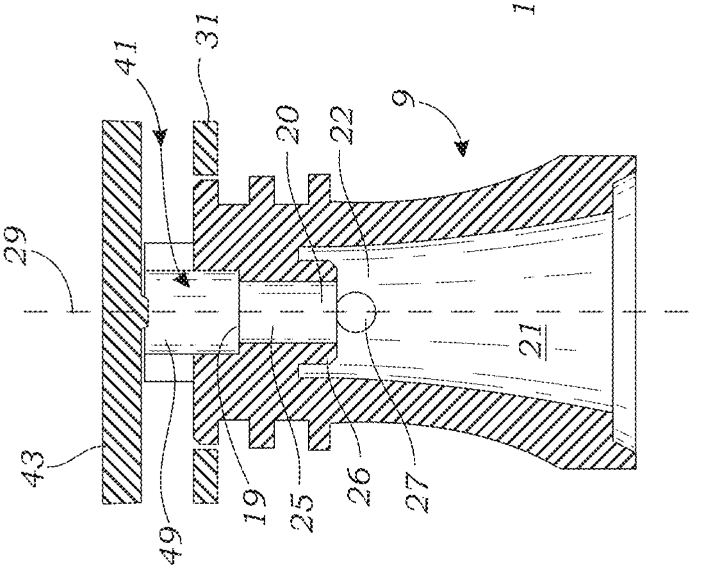
FIG. 9 is a side cutaway view illustrating the showerhead assembly's vortex chamber and nozzle.

As illustrated in FIGS. 2-16, the primary nozzle 9 includes three chambers including a vortex chamber 41, an intermediate chamber 25, and a nozzle chamber 21. As illustrated in FIG. 9, the primary nozzle 9 has a tubular sidewall 17 which, in turn, forms a central axis 29 of the vortex chamber 41, and intermediate chamber 25, and a nozzle chamber 21. The central axis is also referred to herein as the nozzle's longitudinal axis. As understood by those skilled in the art, the nozzle chamber's outlet 23 preferably has a radially outward tapered construction which sprays water upon the person taking a shower.

Figure 7:
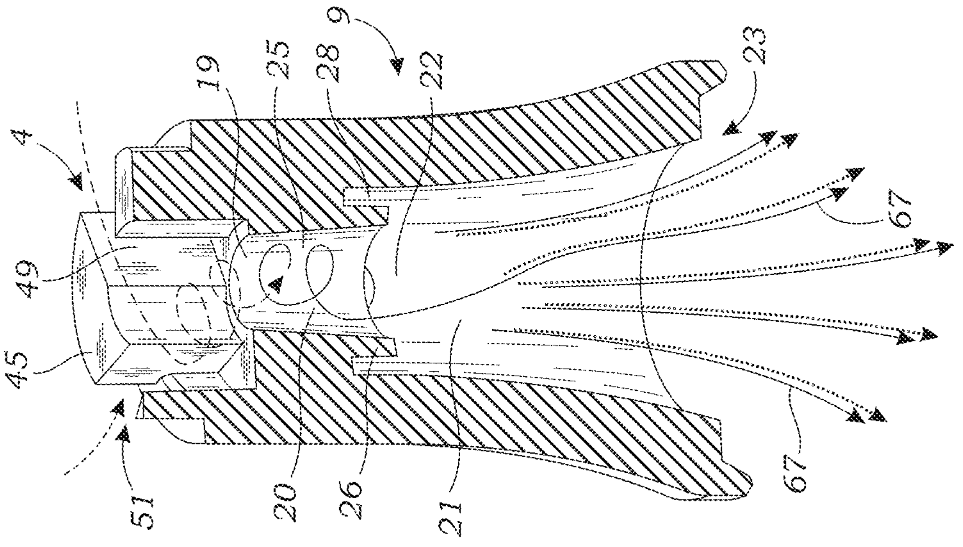
FIG. 7 is a perspective cutaway view of the nozzle and vortex chamber illustrated in FIG. 5 with arrows illustrating the passage of water through the vortex chamber and through the nozzle.
Figure 6:
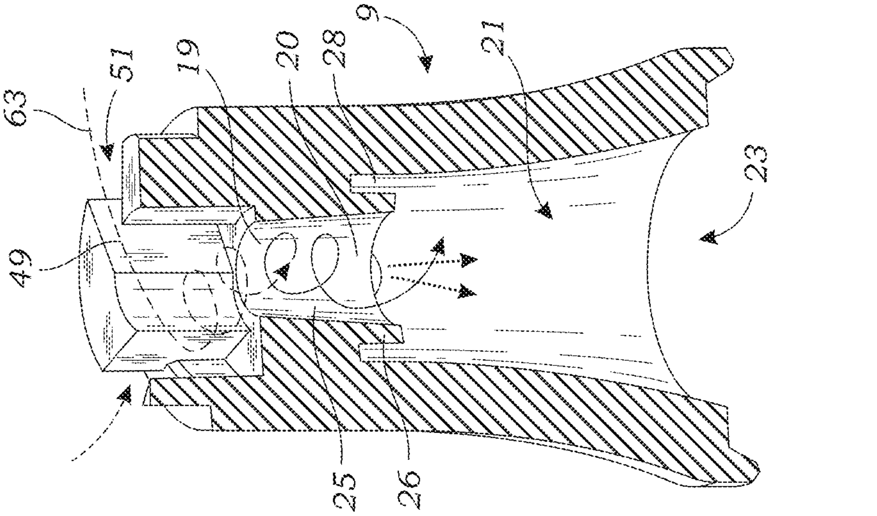
FIG. 6 is a perspective cutaway view of the nozzle and vortex chamber illustrated in FIG. 5 with arrows illustrating the passage of water through the vortex chamber and into the nozzle's inlet.
Figure 5:
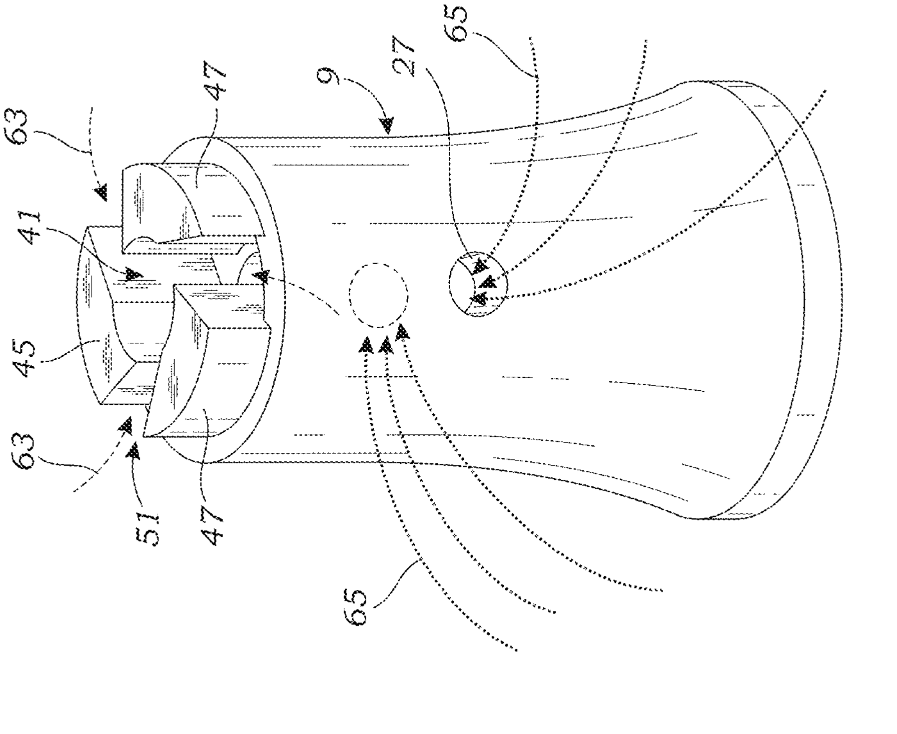
FIG. 5 is a top perspective view of the showerhead assembly's nozzle and vortex chamber with arrows illustrating the passage of air through the nozzle's holes.

The showerhead assembly 1 further includes a vortex chamber 41 which is located between the showerhead assembly's fluid conduit 2 and primary nozzle 9. As best illustrated in FIGS. 5-7, the vortex chamber is constructed to receive water from the fluid conduit 2 and rotate the water into a swirling mass before being communicated to the nozzle's inlet 19. To swirl the water, vortex chamber has a cap 43 which directs water radially outward, before the water 63 is diverted inward between blades 45. Each of the blades 45 have a blade periphery 47 and a blade interior 49. Further, each of the blades 45 are spaced apart from one another to form passageways 51 which extend radially, at least partially, perpendicular to the nozzle's longitudinal axis 29. Preferably, and as illustrated in FIGS. 5-10, the passageways 51 extend perpendicular to the nozzle's longitudinal axis, in other words at 90° relative to the direction that the nozzle sprays water. Furthermore, as illustrated best in FIGS. 5-7, each of the blades 45 are angled in a swirling pattern so that the blades interior surface 49 causes water passing through the passageways 51 to swirl within the middle of the vortex chamber 41. Once water 63 within the vortex chamber has begun to swirl, the water's only place to escape is into intermediate chamber 25.

The intermediate chamber 25 has an intermediate chamber inlet 19 and an intermediate chamber outlet 20. Importantly, the intermediate chamber 25 has a reduced diameter which causes an increase in water velocity. More specially, the intermediate chamber 25 has a decreased cross-section which forms a constricted section which increases the velocity of water flowing through the nozzle. The intermediate chamber may be constructed of various shapes. For example, a preferred intermediate chamber shown in FIGS. 9-10 has a cylindrical shape. However, an alternative preferred intermediate chamber construction 25, shown in FIGS. 3-7, includes an inlet 19 having a diameter smaller than the intermediate chamber's outlet 20 so as to provide the intermediate chamber 25 with a frusto-conical shape. The term "frusto-conical" is intended to be interpreted broadly such that the walls of the intermediate chamber 25 may be slights convex or concave.

The showerhead assembly's nozzle chamber 21 is immediately downstream of the intermediate chamber 25 so that water exiting the intermediate chamber 25 inters the nozzle chamber's inlet 22. The nozzle chamber inlet 22 has a diameter larger than the intermediate chamber's outlet 20. Further, the intermediate chamber's outlet 20 includes a tubular section 26 which projects into the nozzle chamber 21 to form an annular region 28 within the nozzle chamber 21 which is located around the tubular section 26. The nozzle chamber 21 may be constructed in various shapes. However, as illustrated in FIGS. 1-16, the nozzle chamber includes an inlet 22 having a diameter smaller than the intermediate chamber's outlet 22 so as to provide the intermediate chamber 25 with a frusto-conical shape. Again, the term "frusto-conical" is intended to be interpreted broadly as the preferred nozzle chamber sidewall 17 shown in FIGS. 1-16 has a slightly arcuate shape.

Figure 10:
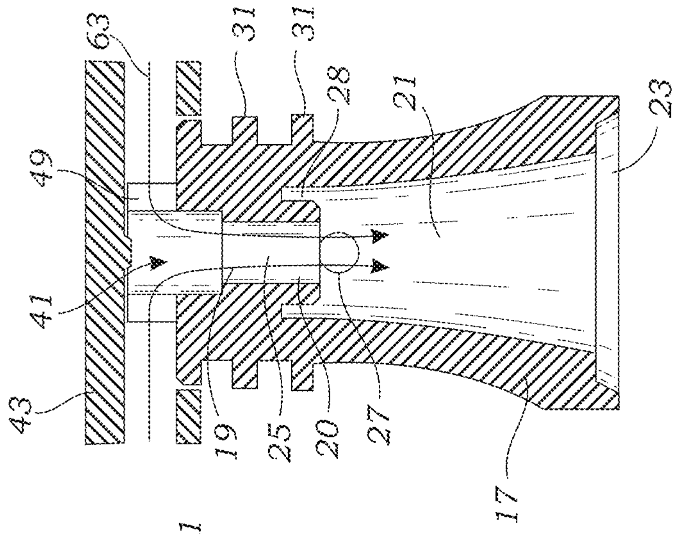
FIG. 10 is a side cutaway view illustrating the showerhead assembly's vortex chamber and nozzle with arrows illustrating the passage of water through the vortex chamber into the nozzle's inlet.
Figure 8:
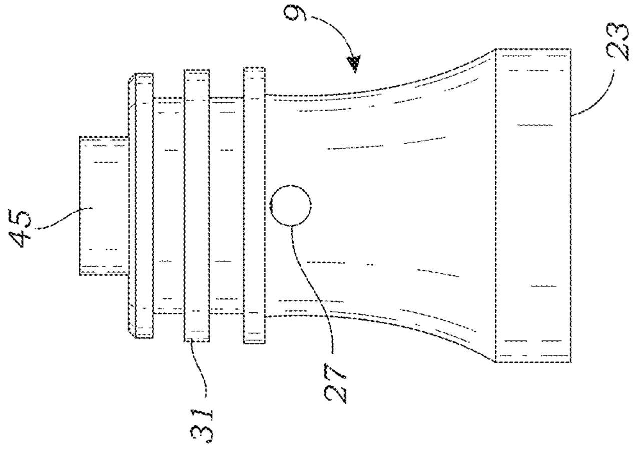
FIG. 8 is a side view of an embodiment of the showerhead assembly's nozzle.

As best illustrated in FIGS. 5-10, nozzle 9 has at least one hole 27 which projects through the nozzle's sidewall 17 into the nozzle chamber 21. The nozzle 9 may include any number of holes 27. However, in the preferred embodiments illustrated in the Figures, the nozzle includes two holes located on opposite sides of the nozzle. The nozzle holes 27 project through the nozzle's sidewall 17 into the nozzle chamber's annular region 28 or, as illustrated in FIGS. 9 and 9, immediately downstream of the intermediate chamber 25. As illustrated in FIGS. 8-10, the nozzle 9 may include any number of circumferential ribs 31 for supporting an O-ring and for maintaining structural stability of the nozzle within the housing 13.

Figure 16:
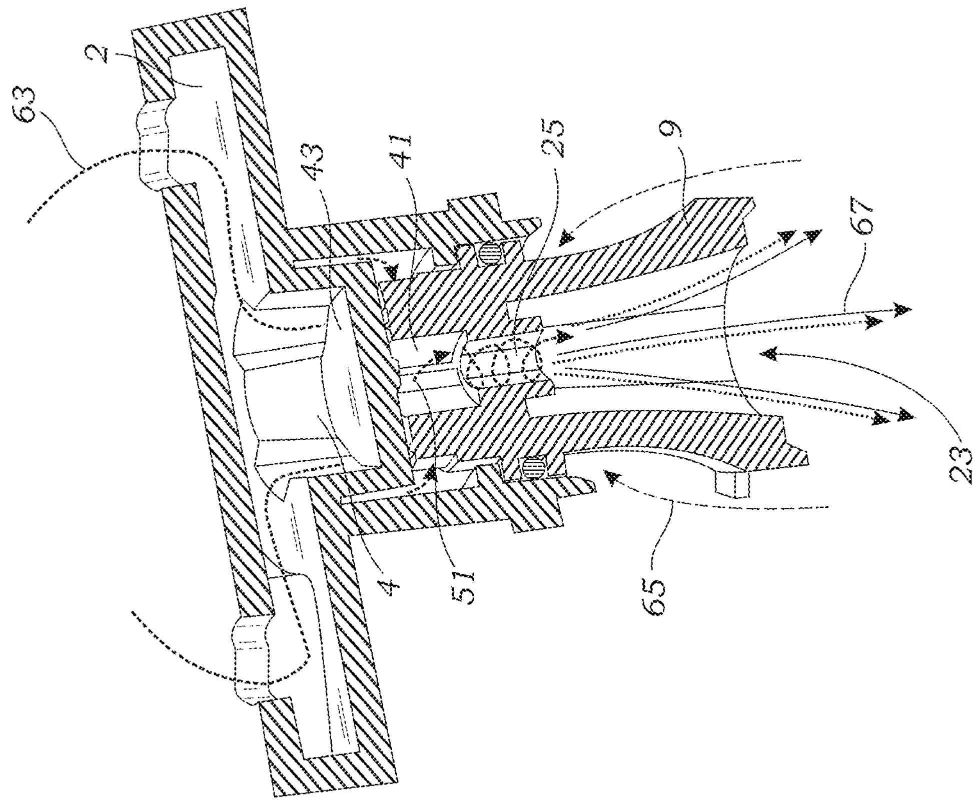
FIG. 16 is a perspective cutaway view illustrating the showerhead assembly's fluid conduit outlet, vortex chamber and nozzle with arrows illustrating the passage of water expelled from the nozzle outlet, and with arrows illustrating the passage of air through the holes.
Figure 15:
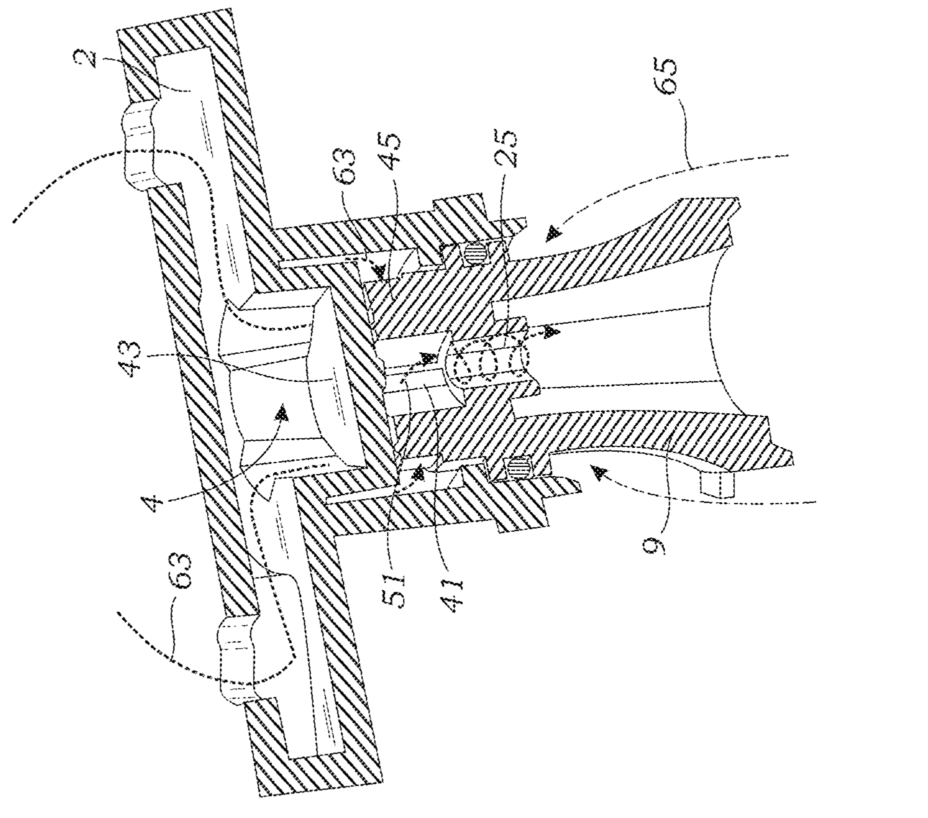
FIG. 15 is a perspective cutaway view illustrating the showerhead assembly with arrows illustrating the passage of water through the fluid conduit, vortex chamber and nozzle, and arrows illustrating air entering the nozzle holes.

The showerhead assembly 1, and particularly the nozzle construction 9, aspirates air into the shower water stream to produce oxygen enriched water. As water flows through the nozzle, the low-pressure area within the nozzle chamber aspirates air through the one or more nozzle holes so as to mix water and air together. The quicker the water flow, the greater the pressure differential and resulting introduction of air into the water. As illustrated in FIGS. 1, 7 and 16, the result is aerated water 67 that has become enriched with dissolved oxygen. The nozzle sprays this fine mixture of water droplets and entrained air from the nozzle's outlet 23.

Figure 12:
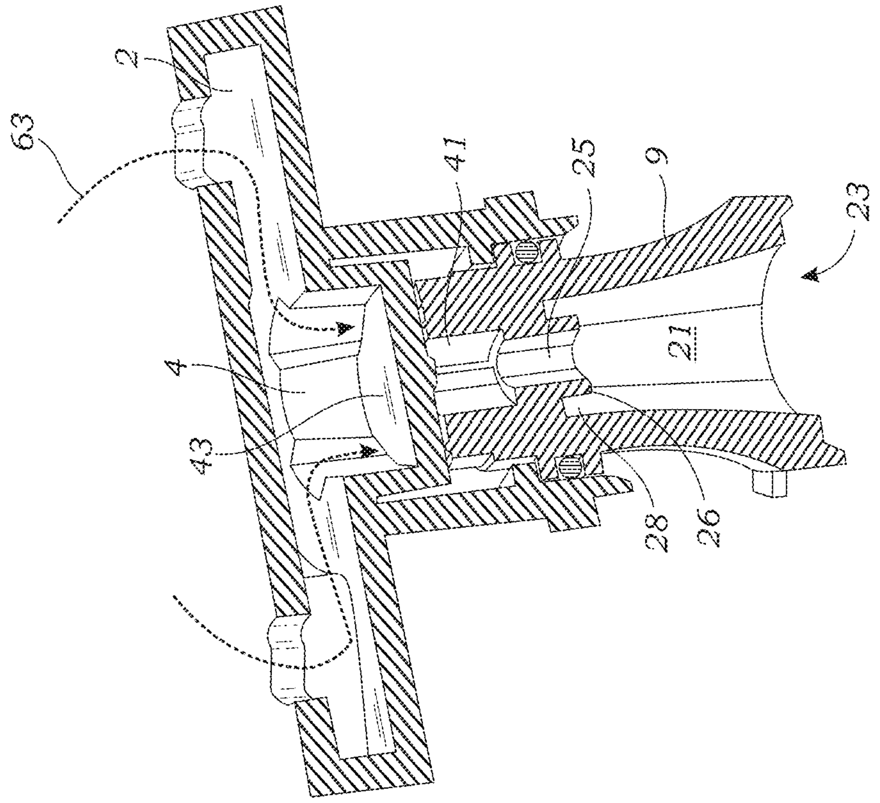
FIG. 12 is a perspective cutaway view illustrating the showerhead assembly's fluid conduit outlet, vortex chamber and nozzle with arrows illustrating the passage of water to the fluid conduit's outlet.
Figure 11:
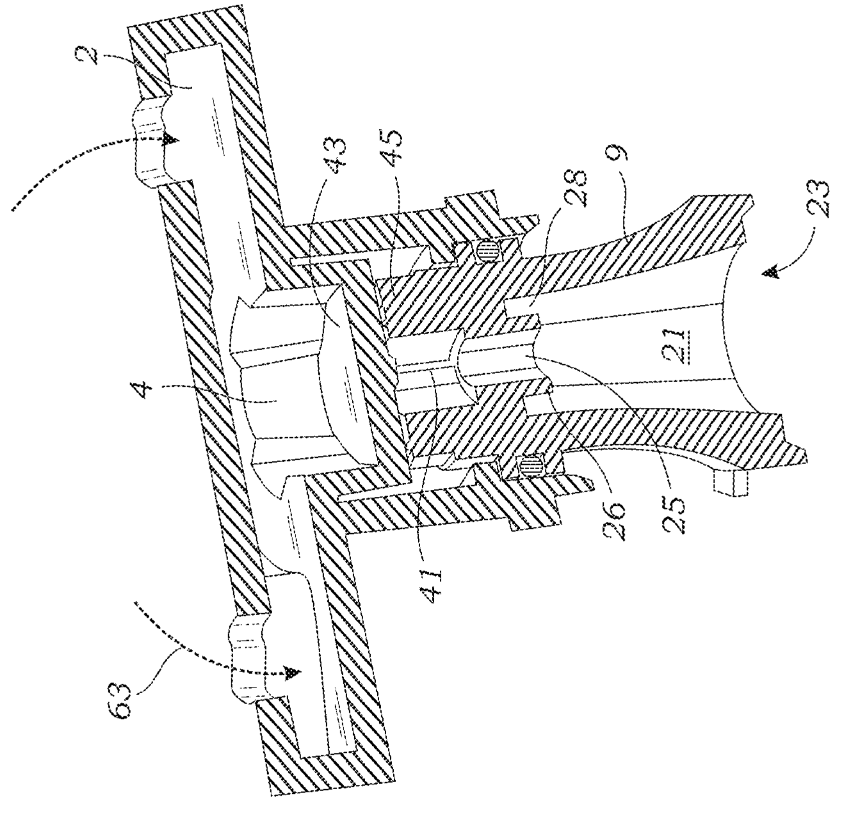
FIG. 11 is a perspective cutaway view illustrating the showerhead assembly's fluid conduit outlet, vortex chamber and nozzle.
Figure 14:
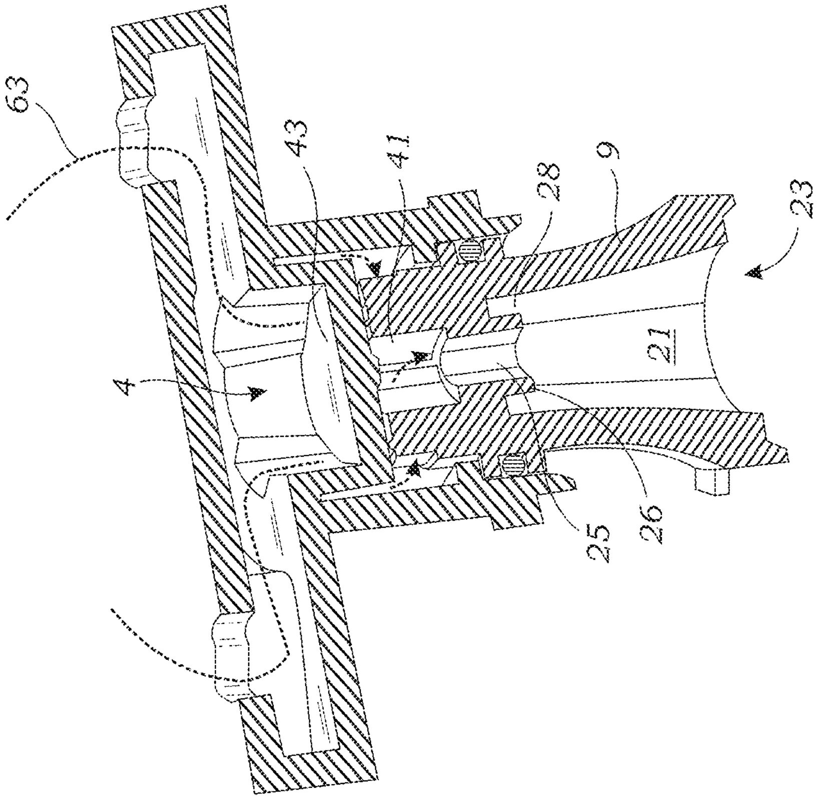
FIG. 14 is a perspective cutaway view illustrating the showerhead assembly's fluid conduit outlet, vortex chamber and nozzle with arrows illustrating the passage of water through the fluid conduit's outlet and the center of the vortex chamber.
Figure 13:
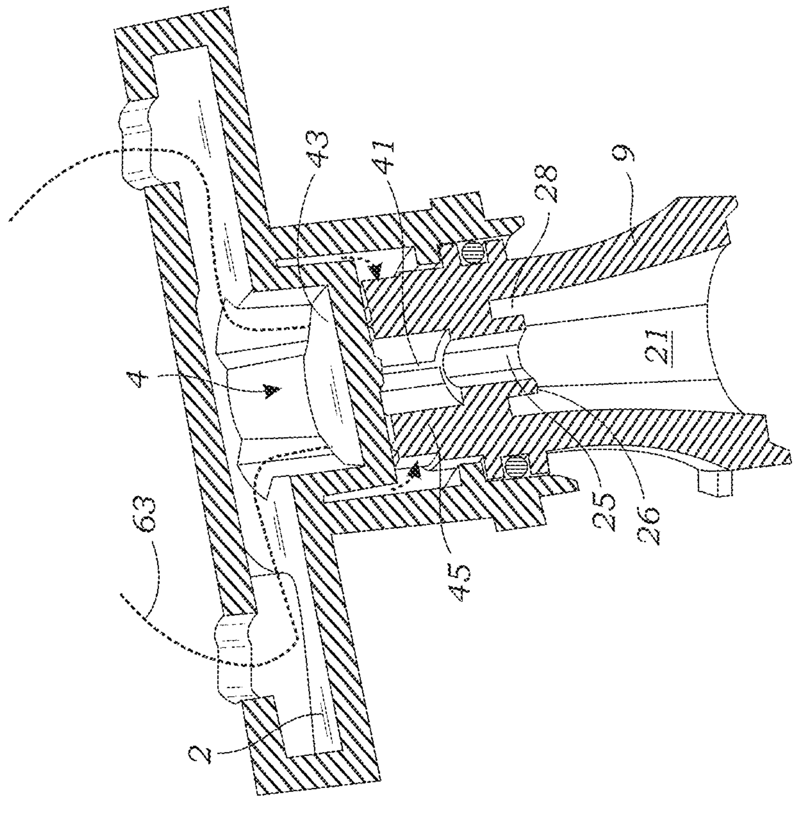
FIG. 13 is a perspective cutaway view illustrating the showerhead assembly's fluid conduit outlet, vortex chamber and nozzle with arrows illustrating the passage of water through the fluid conduit's outlet to the vortex chamber.

With reference to FIG. 12, in operation, water 63 flows through the showerhead assembly's fluid conduit 2 until reaching the fluid conduit's outlet 4 where the water strikes and is diverted radially outward by the cap 43. As illustrated in FIGS. 13 and 14, water then engages the vortex chamber's blades 45 which divert the water through the passageways 51. The blades 45 induce a swirling action as illustrated in FIGS. 6, 7, 15 and 16. The water 63 then continues to rotate through the intermediate chamber 25 past the nozzle's holes 27 and into the nozzle's central chamber 21. As a result of the increased water velocity caused by the nozzle's constricted intermediate section 25 and the swirling action induced by the vortex chamber 41, air 65 is sucked through the nozzle's holes 27. This results in a mixture of water 63 and air 65 creating an oxygen enriched water 67 which is expelled from the nozzle's outlet 23.

The nozzle with vortex chamber construction can be incorporated into any shower assembly. However, in the preferred embodiment illustrated in FIG. 1, the shower assembly 1 has a housing 13. The shower assembly's housing 13 encapsulates the nozzle's sidewall 17, but is spaced apart from the sidewall 17 so as to create an annular cavity. Furthermore, the housing 13 includes a plurality of openings which allow air to enter into the annular cavity. The openings may be located anywhere on the housing. However, in the preferred embodiment illustrated in FIG. 1, the housing has notches 35 which are located between the interface of the housing and the nozzle's outlet 23. The notches 35 form openings in the housing which allow air 65 to be sucked into the showerhead assembly's annular cavity. Once in the annular cavity, the air 65 can then be aspirated through the nozzle's holes 27 into the water stream 63 so as to create the aerated water 67. As a result, in the enhanced velocity provided by the vortex chamber, the aerated water 67 has an increased water droplet size which is expelled from the nozzle's outlet 23 with increased force.

While a preferred showerhead assembly has been illustrated and described, it would be apparent that various modifications of the showerhead assembly can be made without departing from the spirit and scope of the invention. Accordingly, it is not intended that the invention be limited except by the following claims. Having described my invention in such terms to enable a person skilled in the art to understand the invention, recreate the invention, and practice it, and having identified the presently preferred embodiments thereof, I claim:

The invention claimed is:

1. A water spraying assembly comprising:

a fluid conduit for connecting and for receiving water from a water supply, said fluid conduit including an outlet for expelling water from within said fluid conduit;

a vortex chamber having an entrance connecting to said fluid conduit's outlet and an exit, said vortex chamber including a hollow interior having a longitudinal axis, a plurality of blades each having a periphery and an interior side, and a plurality of passageways between said blades, said blades arranged around said longitudinal axis and spaced laterally away from said nozzle's longitudinal axis to position said blades in an annular arrangement with said hollow interior in the middle of said blades, and said blades spaced apart from one another with the spacing between them forming said passageways, said blades receiving water at their peripheries from said fluid conduit and directing such water to flow in a direction inwardly at least partially perpendicular and rotationally around said longitudinal axis to cause water to rotate within said vortex chamber's hollow interior and to be expelled from said vortex chamber in a rotating manner through said vortex chamber's exit;

an intermediate chamber having an intermediate chamber inlet connected to said vortex chamber exit and an intermediate chamber outlet which includes a tubular section;

a nozzle chamber including sidewall, a nozzle chamber inlet for receiving water from said intermediate chamber outlet, and a nozzle chamber outlet for spraying water;

said intermediate chamber tubular section projects into said nozzle chamber with said intermediate chamber's tubular section smaller than said nozzle chamber inlet so that said nozzle chamber includes an annular gap around said intermediate chamber's tubular section between said intermediate chamber's tubular section and said nozzle chamber's sidewall; and said nozzle sidewall includes one or more holes which project through said nozzle's sidewall, said one or more holes projecting through said sidewall either into said nozzle chamber's annular gap or into said nozzle chamber immediately downstream of said nozzle chamber's annular gap, said one or more holes exposed to the ambient air for receiving air into said one or more holes to aspirate into said nozzle chamber when water flows through said nozzle chamber from said nozzle chamber inlet to said nozzle chamber outlet.

2. The water spraying assembly of claim 1 wherein said nozzle chamber has a frusto-conical shape with said nozzle chamber outlet being larger than said nozzle chamber inlet.

3. The water spraying assembly of claim 2 wherein said intermediate chamber has a frusto-conical shape with said intermediate chamber inlet being smaller than said intermediate chamber outlet.

4. The water spraying assembly of claim 1 wherein said plurality of blades includes three blades.

5. The water spraying assembly of claim 1 wherein said vortex chamber includes a cap located upstream of said blades, said cap engages said blades and covers said vortex chamber's hollow interior so as to obstruct the flow of water received from said fluid conduit's outlet and divert the water to said blades' peripheries.

6. The water spraying assembly of claim 1 further comprising a housing which substantially encapsulates said nozzle's sidewall, said housing radially spaced from said nozzle to form an annular cavity in fluid communication with said one or more holes, and said housing having a plurality of notches positioned around said nozzle's outlet, and said notches permitting the passage of ambient air from exterior of said showerhead assembly into said annular cavity for passage of air to said one or more holes.

7. The water spraying assembly of claim 1 wherein said passageways extend perpendicular to said longitudinal axis so as to direct water to flow inwardly into said vortex chamber's hollow interior in a direction perpendicular to said nozzle's longitudinal axis.

* * * * *